United States Patent
Stevens (10) Patent No.: US 8,631,284 B2
(45) Date of Patent: Jan. 14, 2014

(54) METHOD FOR PROVIDING ASYNCHRONOUS EVENT NOTIFICATION IN SYSTEMS

(75) Inventor: Curtis E. Stevens, Irvine, CA (US)

(73) Assignee: Western Digital Technologies, Inc., Irnive, CA (US)

( * ) Notice: Subject to any disclaimer, the term of this patent is extended or adjusted under 35 U.S.C. 154(b) by 427 days.

(21) Appl. No.: 12/772,101

(22) Filed: Apr. 30, 2010

(65) Prior Publication Data
US 2011/0271151 A1 Nov. 3, 2011

(51) Int. Cl.
*G06F 11/00* (2006.01)

(52) U.S. Cl.
USPC .................................. 714/48; 714/50; 714/25

(58) Field of Classification Search
USPC .................. 714/48, 50, 25; 709/224
See application file for complete search history.

(56) References Cited

U.S. PATENT DOCUMENTS

| | | | |
|---|---|---|---|
| 5,249,231 A * | 9/1993 | Covey et al. ................. | 711/163 |
| 5,537,417 A | 7/1996 | Sharma et al. | |
| 5,974,541 A | 10/1999 | Hall et al. | |
| 6,138,180 A | 10/2000 | Zegelin | |
| 6,226,741 B1 | 5/2001 | Shen et al. | |
| 6,279,060 B1 | 8/2001 | Luke et al. | |
| 6,286,061 B1 * | 9/2001 | Ross ............................. | 710/33 |
| 6,378,004 B1 | 4/2002 | Galloway et al. | |
| 6,439,464 B1 | 8/2002 | Fruhauf et al. | |
| 6,457,069 B1 | 9/2002 | Stanley | |
| 6,484,219 B1 | 11/2002 | Dunn et al. | |
| 6,490,636 B1 * | 12/2002 | Kikuchi et al. ................. | 710/5 |
| 6,505,268 B1 * | 1/2003 | Schultz et al. ................. | 711/4 |
| 6,631,159 B1 | 10/2003 | Morris | |
| 6,647,452 B1 | 11/2003 | Sonoda | |
| 6,671,765 B1 | 12/2003 | Karlsson et al. | |
| 6,675,243 B1 * | 1/2004 | Bastiani et al. ............... | 710/105 |
| 6,681,282 B1 | 1/2004 | Golden et al. | |
| 6,704,819 B1 | 3/2004 | Chrysanthakopoulos | |
| 6,704,824 B1 | 3/2004 | Goodman | |
| 6,721,885 B1 | 4/2004 | Freeman et al. | |
| 6,735,720 B1 | 5/2004 | Dunn et al. | |
| 6,742,055 B2 | 5/2004 | Matsunaga | |

(Continued)

FOREIGN PATENT DOCUMENTS

| | | |
|---|---|---|
| EP | 2180410 | 4/2010 |
| WO | 03023629 | 3/2003 |

OTHER PUBLICATIONS

PCT Search Report in corresponding application PCT/US 11/34633 dated Jul. 18, 2011, submitted herewith.

(Continued)

*Primary Examiner* — Loan L. T. Truong (57) ABSTRACT

A method is provided for asynchronous notifications from a device to a host in systems without requiring hardware provision for asynchronous operations. In an embodiment of the invention, a system supports command queuing and a command is sent from a host to a device. The device receives the command and an associated tag, and accepts the command as valid. After accepting the command, the device begins monitoring for asynchronous events. If an asynchronous event is detected, the device provides notification of the event by sending a response and the associated tag to the host. In another embodiment of the invention, a method of asynchronous notification enables use of invalid tags. In a further embodiment of the invention, asynchronous notifications may be enabled by a host and operate without additional host commands.

16 Claims, 6 Drawing Sheets

(56) References Cited

U.S. PATENT DOCUMENTS

| | | |
|---|---|---|
| 6,754,817 B2 | 6/2004 | Khatri et al. |
| 6,766,480 B2 * | 7/2004 | Oldfield et al. ............... 714/52 |
| 6,795,872 B2 | 9/2004 | Page et al. |
| 6,901,473 B2 | 5/2005 | Klissner |
| 6,901,596 B1 | 5/2005 | Galloway |
| 6,907,458 B2 | 6/2005 | Tomassetti et al. |
| 6,910,070 B1 | 6/2005 | Mishra et al. |
| 6,928,562 B2 | 8/2005 | Cohen et al. |
| 6,963,986 B1 | 11/2005 | Briggs et al. |
| 6,976,080 B1 | 12/2005 | Krishnaswamy et al. |
| 7,013,336 B1 * | 3/2006 | King .............................. 709/224 |
| 7,082,598 B1 | 7/2006 | Le et al. |
| 7,100,040 B2 | 8/2006 | Fortin et al. |
| 7,197,578 B1 | 3/2007 | Jacobs |
| 7,231,501 B2 * | 6/2007 | Azevedo et al. ............. 711/156 |
| 7,243,200 B2 * | 7/2007 | Day et al. ..................... 711/163 |
| 7,260,749 B2 | 8/2007 | Cox |
| 7,266,625 B2 | 9/2007 | Sakaki et al. |
| 7,272,745 B2 * | 9/2007 | Seto ................................ 714/3 |
| 7,281,074 B2 | 10/2007 | Diefenbaugh et al. |
| 7,451,454 B2 | 11/2008 | Chen et al. |
| 7,457,887 B1 | 11/2008 | Winkler et al. |
| 7,457,914 B2 | 11/2008 | Cordella et al. |
| 7,546,357 B2 | 6/2009 | Manchester et al. |
| 7,548,994 B2 * | 6/2009 | Ali et al. ........................ 710/5 |
| 7,554,274 B2 | 6/2009 | Wang et al. |
| 7,565,108 B2 | 7/2009 | Kotola et al. |
| 7,568,132 B2 * | 7/2009 | Nakayama et al. ............ 714/48 |
| 7,577,748 B2 | 8/2009 | Yoshida |
| 7,589,629 B2 * | 9/2009 | Tupman et al. .......... 340/539.11 |
| 7,689,744 B1 * | 3/2010 | McCarty et al. ................ 710/74 |
| 7,706,820 B2 | 4/2010 | Yamaki |
| 7,752,029 B2 | 7/2010 | Tamayo et al. |
| 7,752,340 B1 * | 7/2010 | Porat et al. ........................ 710/5 |
| 7,792,046 B2 | 9/2010 | Kucharczyk et al. |
| 8,165,301 B1 * | 4/2012 | Bruce et al. .................... 380/277 |
| 8,180,931 B2 | 5/2012 | Lee et al. |
| 8,260,885 B2 | 9/2012 | Lindstrom |
| 8,285,923 B2 * | 10/2012 | Stevens ........................ 711/112 |
| 2002/0103943 A1 * | 8/2002 | Lo et al. ............................ 710/2 |
| 2003/0037171 A1 * | 2/2003 | Madineni et al. ............. 709/310 |
| 2003/0233154 A1 | 12/2003 | Kobziar |
| 2004/0236897 A1 | 11/2004 | Cheng |
| 2004/0243737 A1 | 12/2004 | Beardsley et al. |
| 2004/0243738 A1 * | 12/2004 | Day et al. ........................ 710/22 |
| 2004/0264284 A1 * | 12/2004 | Priborsky et al. ............. 365/232 |
| 2005/0027894 A1 * | 2/2005 | Ayyavu et al. .................... 710/5 |
| 2005/0038791 A1 | 2/2005 | Ven |
| 2005/0086397 A1 | 4/2005 | Huffman et al. |
| 2005/0160320 A1 * | 7/2005 | Elez ................................ 714/33 |
| 2005/0171970 A1 * | 8/2005 | Ozzie et al. ................... 707/102 |
| 2006/0053234 A1 * | 3/2006 | Kumar et al. .................... 710/11 |
| 2006/0067209 A1 | 3/2006 | Sheehan et al. |
| 2006/0095693 A1 | 5/2006 | Aida et al. |
| 2006/0159109 A1 * | 7/2006 | Lamkin et al. ................ 370/401 |
| 2006/0271676 A1 | 11/2006 | Talayco et al. |
| 2006/0280149 A1 | 12/2006 | Kuhl et al. |
| 2007/0011360 A1 * | 1/2007 | Chang et al. ...................... 710/5 |
| 2007/0174509 A1 * | 7/2007 | Day et al. ........................ 710/22 |
| 2007/0204089 A1 | 8/2007 | Proctor |
| 2008/0005116 A1 | 1/2008 | Uno |
| 2008/0005311 A1 | 1/2008 | Ali et al. |
| 2008/0046612 A1 | 2/2008 | Beardsley et al. |
| 2008/0071940 A1 | 3/2008 | Kim et al. |
| 2008/0126628 A1 | 5/2008 | Mullis et al. |
| 2008/0204089 A1 | 8/2008 | Nakasha |
| 2009/0037622 A1 | 2/2009 | Dheeresh et al. |
| 2009/0124375 A1 * | 5/2009 | Patel .............................. 463/29 |
| 2009/0177815 A1 * | 7/2009 | Nemazie et al. ................ 710/71 |
| 2010/0057966 A1 * | 3/2010 | Ambikapathy et al. ...... 710/260 |
| 2010/0115143 A1 * | 5/2010 | Nakajima ........................ 710/5 |
| 2010/0169686 A1 * | 7/2010 | Ryoo et al. .................... 713/323 |
| 2010/0298718 A1 | 11/2010 | Gilham et al. |
| 2011/0029808 A1 | 2/2011 | Moshayedi |
| 2011/0055494 A1 | 3/2011 | Roberts et al. |
| 2011/0219163 A1 | 9/2011 | Beadnell et al. |

OTHER PUBLICATIONS

PCT Search Report and Written Opinion in corresponding application PCT/US 11/34633 dated Jul. 18, 2011, 8 pages.

* cited by examiner

METHOD FOR PROVIDING ASYNCHRONOUS EVENT NOTIFICATION IN SYSTEMS

BACKGROUND

Computers and computer systems have become ubiquitous. With the great range of computer hardware and software available, it has become important to set a number of standards for connecting various computer devices and communicating among them.

The computer industry has formed organizations of member companies to provide standards that permit compatibility and interoperability. Standards are now available for hardware and software connection between computers and peripherals, for example. Internal computer devices such as disk drives and input/output devices, and external products such as portable devices are attached to computers with standard interface cables and use standard communication protocols. Some widely adopted examples include USB, ATA, and Serial ATA (SATA or eSATA) interfaces.

In each of these systems, the host initiates operations and sends commands to the device, and the device responds to host commands following pre-defined protocols. There is no provision in these interfaces for a device to initiate a command or operation to a host. A device can only send information to a host that has been requested by a host-sent command or otherwise directly caused by a host action.

Such protocols use asymmetric interfaces where host and devices have defined roles of command and response (e.g., the host commands and the device responds) and are unlike peer-to-peer communication protocols where a unit can operate as both an initiator and as a target. SCSI is one standard interface that provides this peer-to-peer support.

Some system interfaces may allow for hardware notification between units via the host to device cable, however new interfaces favor serial communication that cannot provide a dedicated signal on the cable, and are not provided in systems such as Serial ATA or USB.

In a system with a host and a device where there is no provision for a device to notify a host of an important event at any time, the device has only unfavorable options. For example, upon failure conditions or events from which a device cannot recover, some devices may resort to self resetting or aborting outstanding commands in order to force a host to take notice and hopefully recover. This may cause catastrophic loss of data or result in an inoperable system. System timeouts or resets are a last resort to attempt recovery. Additionally, device to host notifications may be desirable before a situation becomes critical, such as environmental conditions or recoverable errors.

Figure 1:
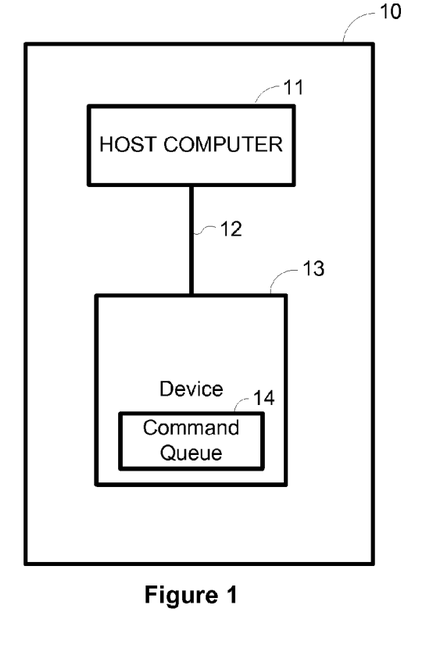
FIG. 1 illustrates a block diagram of a host and a device system.

FIG. 1 illustrates a system 10 employing a host computer 11, a device 13, and an optional interconnect cable 12, allowing communication between the host computer 11 and device 13. The communication of FIG. 1 may comprise, for example, a Universal Serial Bus, AT Attachment, Serial Attached SCSI, or Serial ATA communication interface. Alternatively, some devices 13 plug directly into a host 11 without the need for a cable 12 and operate in the same manner. The host computer 11 may be any system that can send commands to the device 13. The host computer may be, for example, a desktop computer, notebook computer, or an application specific controller.

The interface between the host computer 11 and the device 13 may be a Universal Serial Bus interface, commonly referred to as a USB interface. The USB interface is also referred to as USB-1, USB-2 or USB-3, and future revisions are expected. Devices may support command queuing, and incorporate a command queue 14. The device 13 may be, for example, an I/O device such as keyboard, printer or mouse; storage device such as a disk drive, solid state drive, CD or DVD player; a communication device such as modems; or a personal entertainment device such as a music or video player.

Figure 2:
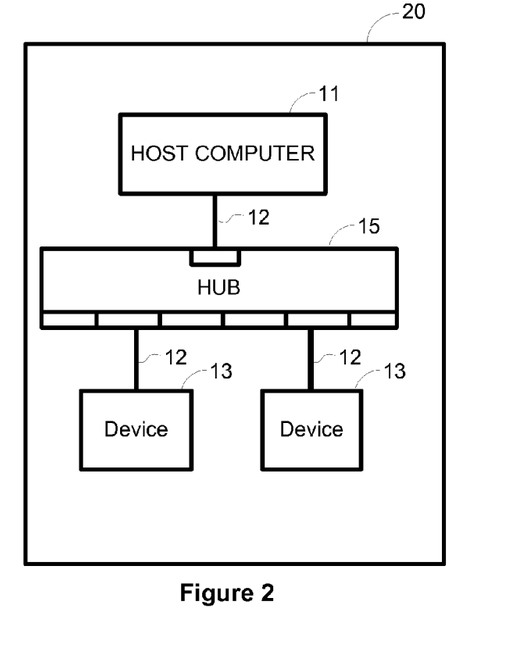
FIG. 2 illustrates a block diagram of a host and a device system with a hub.

FIG. 2 illustrates a system 20 employing a host computer 11 connected with a cable 12 to a host side of a hub 15, and devices 13 connected to a device side of the hub 15 with optional cables 12. The hub provides expansion ports so that multiple devices can connect to a single host port. In the system shown in FIG. 2, the host computer is the communication host; however, the devices are physically connected to the hub 15. The hub provides the physical interface to the devices and will appear to a device as a host. Hubs as shown in FIG. 2 are well known in the art and are widely available. References to hosts or host computers hereinafter may comprise a directly connected host as shown in FIG. 1, or a host connected through a hub as shown in FIG. 2.

Figure 3:
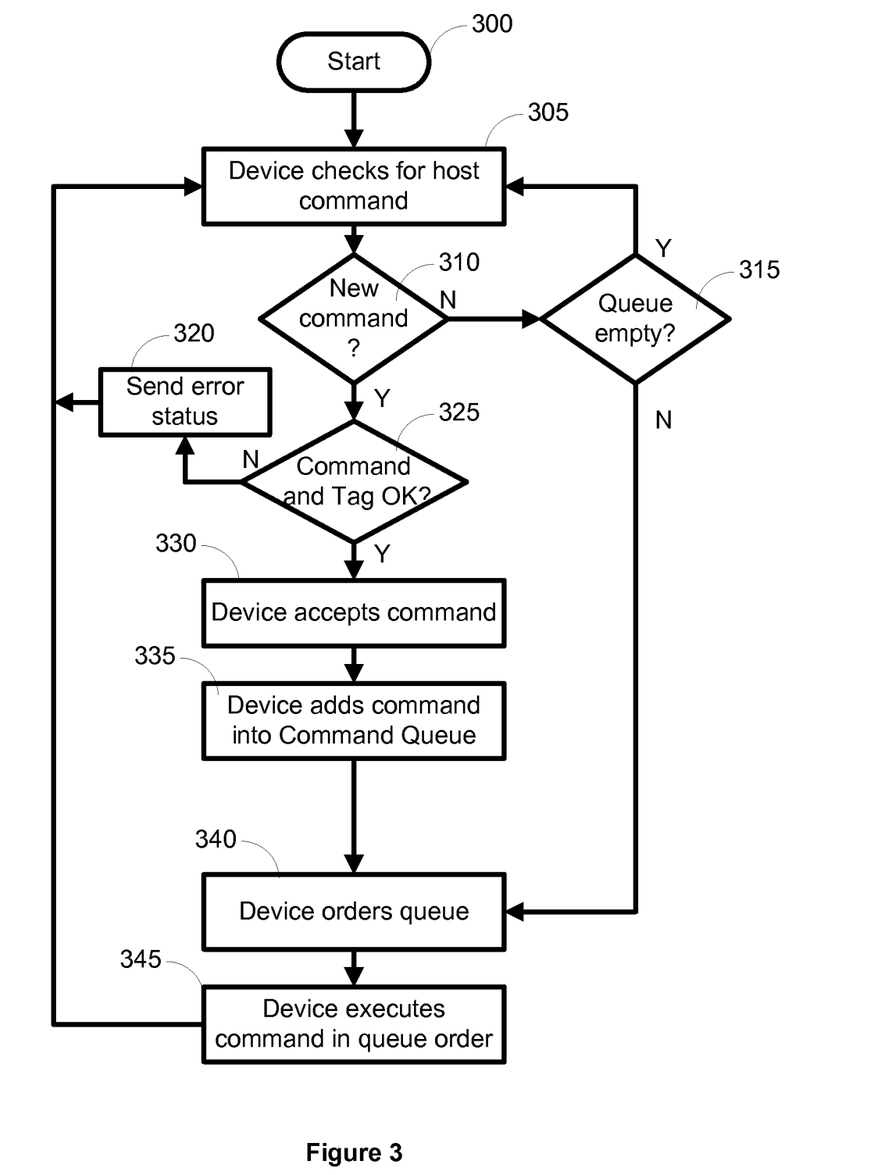
FIG. 3 is a flow chart illustrating a device receiving a queued command.

FIG. 3 illustrates a flow chart of a device receiving a queued command. Beginning in step 300, a device is operating in a system with a host. In block 305, the device checks for a command reception from the host. If no new commands have been received (block 310) the device advances to block 315 to determine if there are any outstanding commands in the command queue. If the queue is empty, the device returns to 305 to continue checking for new commands.

If a new command was received in block 310, the device checks the command and its associated queue command tag validity in block 325. If the command is invalid or the tag is invalid, the device responds to the host by sending an error status in block 320. If the command and tag are valid, the device accepts the command (block 330) for execution. The device will add the command into the device command queue with any other outstanding commands waiting for completion. In block 340, the device will make a determination which command should be executed next and may reorder the queue for optimal performance as needed, although reordering is not required. The device then executes a command from the command queue in 345.

The flow chart shown in FIG. 3 is one example of a queued command process. Alternative embodiments might, for example, perform command reception, queue ordering, and/or command execution as simultaneous operations to provide improved performance.

BRIEF SUMMARY

Methods for providing asynchronous notifications from a device to a host in systems without requiring hardware provision for asynchronous operations are disclosed herein.

In an embodiment of the invention, a method is provided for asynchronous event notification from a device in a system that supports command queuing. The method includes receiving a queued command and queue tag from a host; accepting the queued command from the host without scheduling the command for completion; monitoring device operation for asynchronous events; detecting an asynchronous event; and providing notification of the asynchronous event by scheduling and sending a response comprising the tag to the host.

In another embodiment of the invention, a method is provided for asynchronous event notification from a device in a system that supports command queuing and a command is sent from a host to a device. The device receives the command and an associated queue tag, and determines that the tag is not a valid tag. The device then determines if the command is an asynchronous event notification request type command, and if so, accepts the command as valid. After accepting the command, the device begins monitoring for asynchronous events. If an asynchronous event is detected, the device provides notification of the event by sending a response and the associated tag to the host.

In another embodiment of the invention, a method is provided for asynchronous event notification from a device in a system that supports command queuing and a command is sent from a host to a device to enable unsolicited queue command responses. The device receives the command and assigns or associates a queue tag to the command and enables unsolicited queue command responses. The device begins monitoring for asynchronous events. If an asynchronous event is detected, the device provides notification of the event by sending a response and the associated tag to the host.

DETAILED DESCRIPTION OF THE EMBODIMENTS

Figure 4:
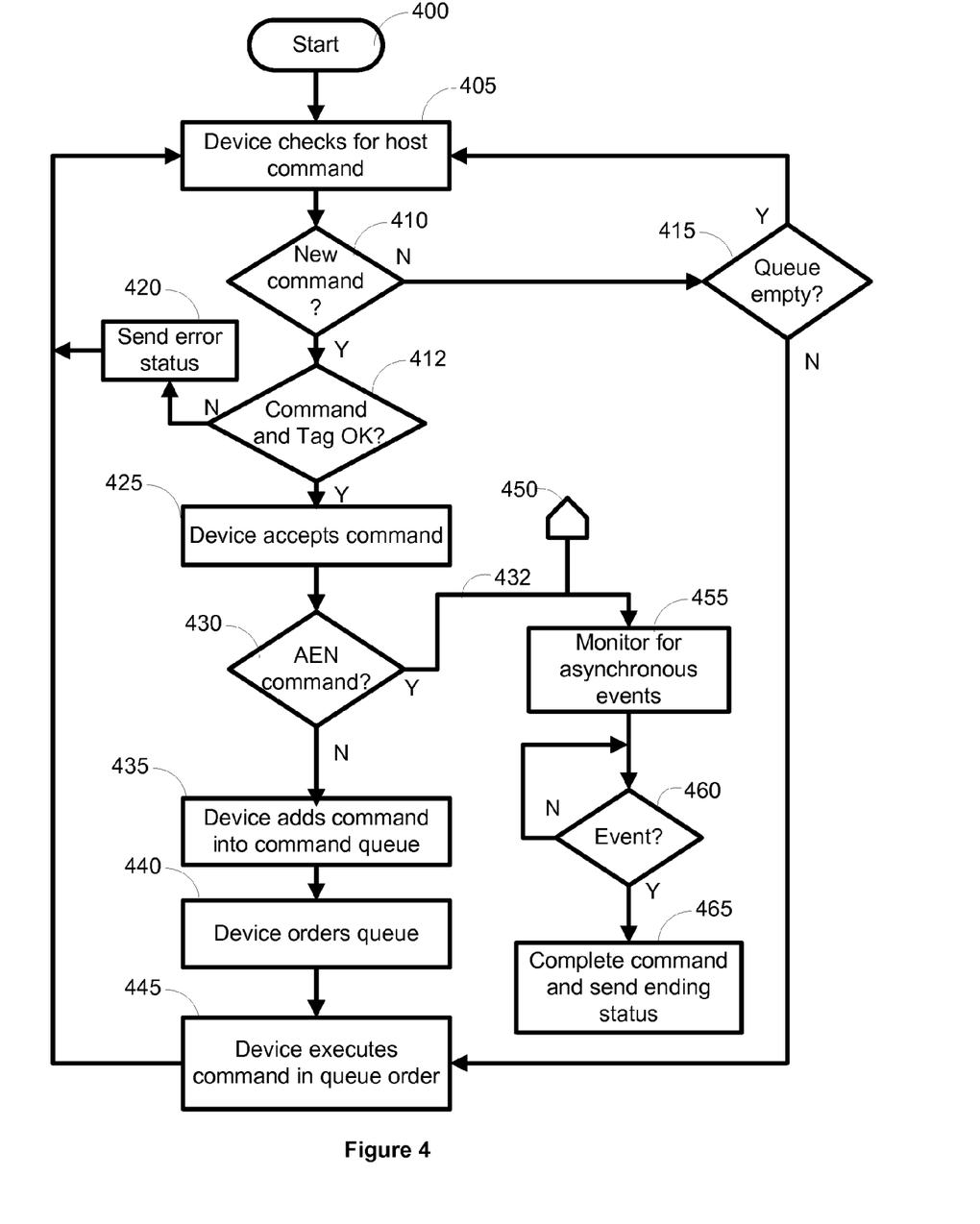
FIG. 4 is a flow chart illustrating an embodiment of the invention with an Asynchronous Event Command.

FIG. 4 illustrates an embodiment of the invention with an Asynchronous Event Command.

Beginning in block 400, a device is operating in a system with a host. In block 405, the device checks for a command reception from the host. If no new commands have been received (block 410) the device advances to block 415 to determine if there are any outstanding commands in the command queue. If the queue is empty, the device returns to 405 to continue checking for new commands. If the queue is not empty, the device continues to execute outstanding commands in block 445.

If a new command was received in block 410, the device checks the command and its associated queue command tag validity in block 412. If the command is invalid or the tag is invalid, the device responds to the host by sending an error status in block 420. If the command and tag are valid, the device accepts the command (block 425). The device checks to determine if the command is an Asynchronous Event Notification command (AEN Command) in block 430. If the command is not an AEN command, the device will add the command into the device command queue (block 435) with any other outstanding commands waiting for completion. In block 440, the device will make a determination which command should be executed next and may reorder the queue for optimal performance as needed. The device then executes a command from the command queue in 445.

Returning to block 430, if the command was an AEN command, the device starts a new process (path 432) comprising blocks 455 through 465. The process beginning in block 455 starts by the device initiating monitoring for asynchronous events. If no event is detected in block 460, the device continues monitoring. If an event is detected in 460, the device will prepare an ending status and transmit the asynchronous event status to the host. Returning again to block 430, if the command was an AEN command, in addition to the new process started in block 455, the process continues processing queue commands by returning to block 405 by path 450.

The embodiment shown in FIG. 4 is one embodiment of a queued command process. Alternative embodiments might, for example, perform command reception, queue ordering, and/or command execution as simultaneous operations to provide improved performance.

Figure 5:
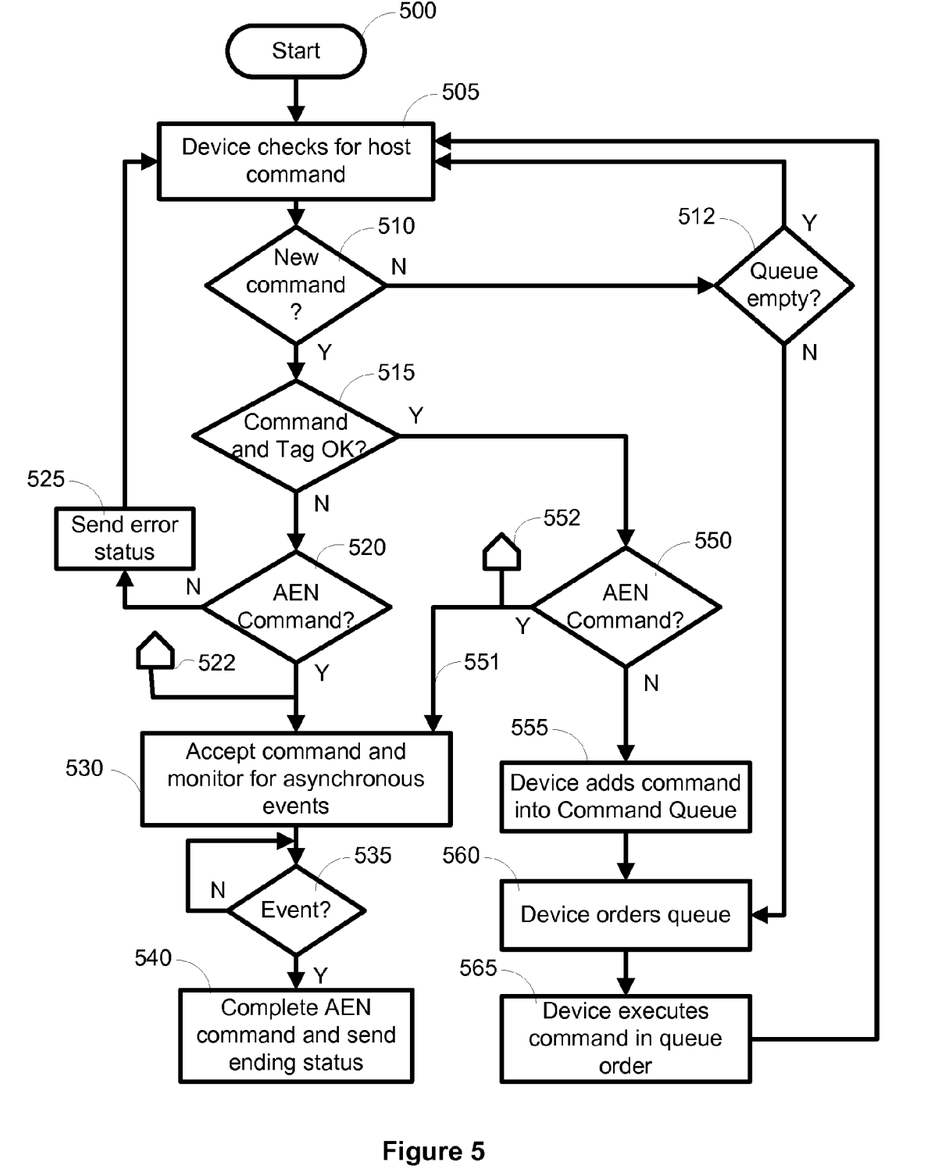
FIG. 5 is a flow chart illustrating an embodiment of the invention with a valid queue command tag or with an invalid queue command tag.

FIG. 5 illustrates an embodiment of the inventive process dealing with a valid or invalid queue command tag. Beginning in block 500, a device is operating in a system with a host. In block 505, the device checks for a command reception from the host. If a new command has been received (block 510) the process advances to block 515 to check the command and its associated queue command tag validity. If the command and tag are valid, the process advances to block 550 and checks the new command received in block 510 to determine if the command is an Asynchronous Event Notification command (AEN Command). If the command is not an AEN command, the device will add the command into the device command queue (block 555) with any other outstanding commands waiting for completion. In block 560, the device will make a determination which command should be executed next and reorders the queue for optimal performance as needed. The device then executes a command from the command queue in 565 and returns to 505 to resume operation.

Returning to block 550, if the command was an AEN command, the device starts a new process (path 551) comprising blocks 530 through 540. The process beginning in block 530 starts by the device accepting the AEN command for processing. The device will initiate monitoring for asynchronous events in block 530. If no event is detected in block 535, the device continues monitoring. If an event is detected in 535, the device will prepare an ending status and transmit the asynchronous event status to the host in block 540 and then return to 505 to continue operation.

Returning again to block 550, if the command was an AEN command, in addition to the new process started in block 530 through path 551, the process continues processing queue commands by returning to block 505 by path 552.

Returning to block 515, if the command and tag are invalid, the process advances to block 520. If the command was an AEN type command the device will initiate monitoring for asynchronous events in block 530. If no event is detected in block 535, the device continues monitoring. If an event is detected in block 535, the device will prepare an ending status and transmit the asynchronous event status to the host in 540 and then return to 505 to continue queue command operation.

Returning again to block 520, in addition to the process started by transitioning to block 530 the device also continues to process queue commands by returning to block 505 through path 522. In block 520, if the command was not an AEN command, the device sends error status to the host and returns to 505 to continue queue command operation.

In the embodiment illustrated in FIG. 5, invalid tags are processed if the command is an AEN command. Invalid tags may be, for example, duplicate tag assignments, out of range values, reserved tags, or any tag that is not normally accepted and will result in an error status to the host. The method of FIG. 5 resolves the problem, wherein if a command with an invalid tag is received, the device may abort all outstanding commands and possibly cause catastrophic failure to the system. In the embodiment illustrated in FIG. 5, invalid tags will be accepted if the command is an AEN command.

In another embodiment of the invention, a device may be enabled by a command or by default operation to begin asynchronous event monitoring and reporting. If a host is aware of the feature by device inquiry, the host may enable the device to initiate asynchronous event notification using an agreed upon command tag. The tag may be a valid or an invalid tag value. The host can provide a preferred tag at the same time the feature is enabled. The device may also provide a default tag.

In another embodiment of the invention, any queued command may include an option bit that enables asynchronous event notification. By using this embodiment of the invention, the host does not need to send any commands to the drive, simplifying operation and overhead. Features enabled in a device may be persistent or not persistent across resets and loss of power. This reduces configuration time after startup and reset operations.

In an embodiment of the invention, the enabling of asynchronous event notification may be selected to persist if a device reset occurs.

In an embodiment of the invention, the enabling of asynchronous event notification may be selected to persist after a device has been powered off.

Figure 6:
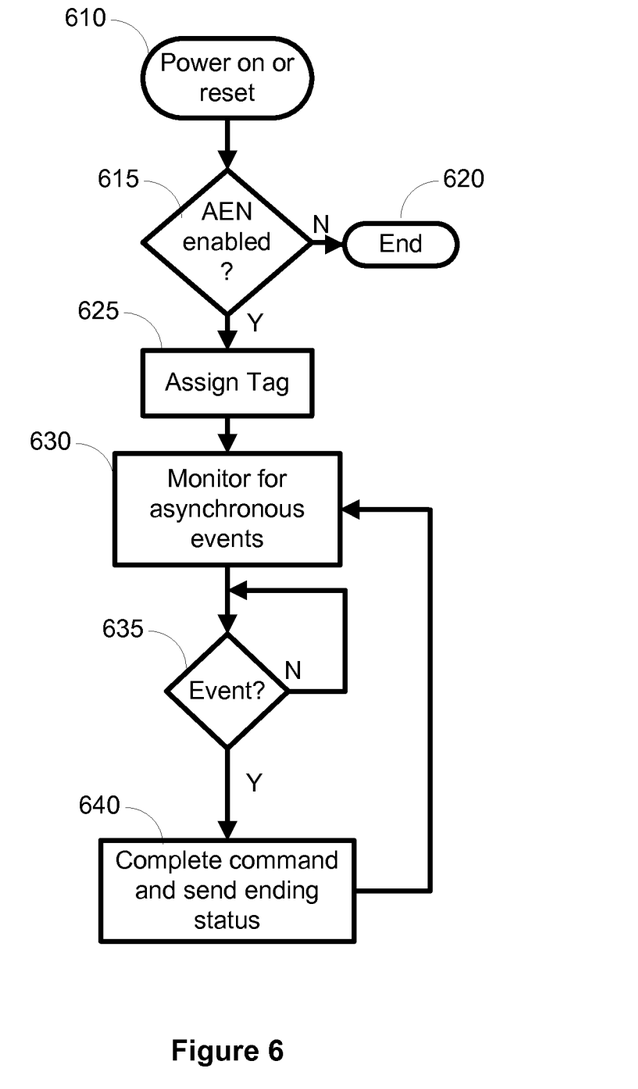
FIG. 6 is a flow chart illustrating an embodiment of the invention with host enabled operation.

FIG. 6 illustrates an embodiment of the invention with host enabled operation.

Beginning in block 610, a power or device reset is applied to the device. After the reset is ended, the device will check its configuration information to determine if the asynchronous event notification feature is enabled in block 615. If the feature is not enabled the process ends in 620. If the feature is enabled, the device will assign a tag (block 625) for AEN command status reporting. The assigned tag may be a tag previously provided by a host, or a tag assigned by the device.

The device will initiate monitoring for asynchronous events in block 630. If no event is detected in block 635, the device continues monitoring. If an event is detected in 635, the device will prepare an ending status and transmit the asynchronous event status to the host in 640 and then optionally return to 630 to continue monitoring.

In the embodiments of FIG. 4, FIG. 5 and FIG. 6, the AEN commands are not scheduled for completion and may continue to be outstanding indefinitely without affecting the ongoing queue command operation or queue order. After an asynchronous event occurs, the AEN command will be scheduled for completion. The device may elect for immediate completion or may defer notification depending on the event severity.

Figure 7:
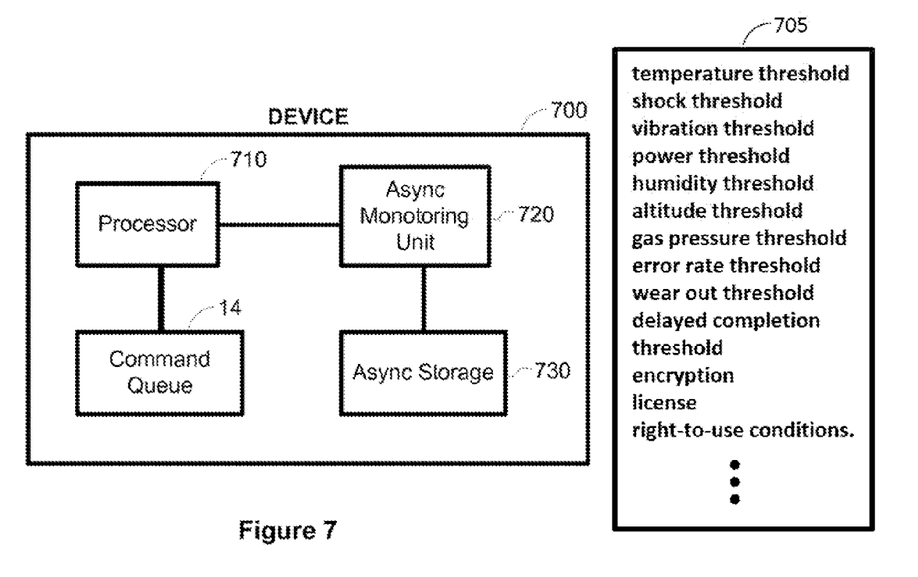
FIG. 7 illustrates a block diagram of a device according to an embodiment of the invention.

FIG. 7 illustrates a block diagram of a device 700 according to an embodiment of the invention. Device 700 comprised a processor 710 and a command queue 14. The command queue may be a portion of memory allocated by the processor 710, or dedicated hardware such as registers or data storage accessible to the processor 710. The queue contains the information related to each outstanding tag queued command. The tags may be a number, illustrated in the queue as separate entries 1, 2, 3, and so on.

An asynchronous monitoring unit 720 may be software operating on the processor 710 or a distinct hardware unit.

In an embodiment, the asynchronous monitoring unit 720 will monitor the asynchronous events through hardware functions or by polling.

In an embodiment, the asynchronous monitoring unit 720 may provide information to the processor 710 by interrupting the processor, or by a processor executing a polling routine.

The asynchronous storage 730 may be any typical memory/data storage distinct from the command queue either thorough separate units, partitions, distinct memory locations, or the like.

Figure 8:
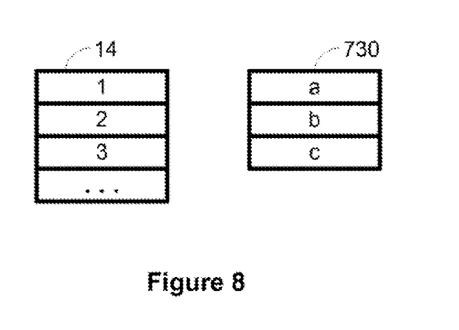
FIG. 8 illustrates separated queue storage according to an embodiment of the invention.

FIG. 8 illustrates queue storage 14 and asynchronous queue storage 730 according to an embodiment of the invention. In this embodiment the command queue 14 is distinct from the asynchronous storage 730. The queue storage 14 may operate independently from asynchronous storage 730 and separately scheduled and ordered for command execution and completion by the processor 710. In an embodiment, operations in asynchronous monitoring unit 720 and asynchronous storage 730 will not affect operations in command queue 14.

Figure 9:
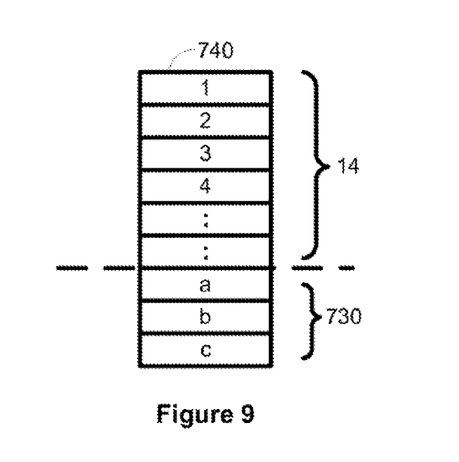
FIG. 9 illustrates partitioned queue storage according to an embodiment of the invention.

FIG. 9 illustrates partitioned queue storage 740 according to an embodiment of the invention. In an embodiment, the portioned queue storage 740 is a common memory or data storage that is allocated by the processor 740. The partitioned storage 740 comprises two partitions, a command queue partition 14 and asynchronous storage partition 730. According to embodiments of the invention, although both partitions may reside in a common memory or data location, they are treated separately.

In an embodiment of the invention, and as shown at 705 in FIG. 7, asynchronous events monitored comprises exceeding at least one threshold related to one or more of the following parameters:

temperature;
shock;
vibration;
power;
humidity;
altitude;
gas pressure;
error rate;
wear out, and
delayed completion thresholds.

In another embodiment of the invention and as also shown at 705 in FIG. 7, the asynchronous events comprise encryption, license, or right-to-use conditions.

Although the foregoing has been described in terms of certain embodiments, other embodiments will be apparent to those of ordinary skill in the art from the disclosure herein. For example, in an alternative embodiment, operations may be performed concurrently, rather than sequentially, thereby improving performance. In another embodiment, the asynchronous event monitoring may be performed in a hardware implementation and reported automatically without processor involvement. Alternatives to embody the invention in combinations of hardware and/or software running on a processor, or as a hardware implementation that is reconfigurable to operate in multiple modes would be design choices apparent to those of ordinary skill in the art. As a consequence, the system and method of the present invention may be embodied as software which provides such programming, such as a set of instructions and/or metadata embodied within a computer readable medium. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

I claim:

1. A method for asynchronous event notification by a device in a system that supports command queuing, comprising:
   receiving a command and a tag from a host;
   accepting the command without scheduling the command for completion;
   monitoring device operation for an asynchronous event, the asynchronous event comprising at least one of an encryption condition, a license condition and a right-to-use condition;
   detecting an asynchronous event; and
   providing notification of the asynchronous event by scheduling the command for completion and sending a response comprising the tag to the host.

2. The method of claim 1 wherein the command comprises an asynchronous event notification request.

3. The method of claim 2 wherein the asynchronous event notification request comprises a command code or command option bit.

4. The method of claim 1 wherein the tag comprises one of an invalid, out of range and a duplicate tag.

5. The method of claim 1 wherein the asynchronous event comprises exceeding at least one threshold related to at least one of:
   temperature;
   shock;
   vibration;
   power;
   humidity;
   altitude;
   gas pressure;
   error rate;
   wear out; and
   delayed completion thresholds.

6. The method of claim 1 wherein receiving and providing comprise using, at least one of Universal Serial Bus, Serial Attached SCSI, AT Attachment and Serial ATA communication.

7. A method for asynchronous event notification by a device in a system that supports command queuing, comprising:
   receiving a command and a tag from a host;
   determining that the command comprises an asynchronous event notification request;
   accepting the command without scheduling the command for completion;
   monitoring device operation for at least one asynchronous us events, the asynchronous event comprising at least one of an encryption condition, a license condition and a right-to-use condition;
   detecting the at least one asynchronous event; and
   providing notification of the at least one asynchronous event by scheduling the command for completion and sending a response comprising the tag to the host.

8. The method of claim 7 wherein the asynchronous event notification request comprises one of a command code and a command option hit.

9. The method of claim 7 wherein determining that the command comprises an asynchronous event notification request comprises determining that the command from the host comprises an invalid tag.

10. The method of claim 9 wherein the invalid tag comprises an out of range or duplicate tag.

11. The method of claim 7 wherein the asynchronous event comprises exceeding at least one threshold related to at least one of:
    temperature;
    shock;
    vibration;
    power;
    humidity;
    altitude;
    gas pressure;
    error rate;
    wear out; and
    delayed completion thresholds.

12. The method of claim 7 wherein receiving and providing comprise using a communication protocol comprising at least one of Universal Serial Bus, AT Attachment, Serial Attached SCSI and Serial ATA communication.

13. A method for asynchronous notification from a device in a system that supports command queuing, comprising:
    receiving a command from a host to enable unsolicited queue command responses;
    assigning a tag for unsolicited queue command responses;
    enabling unsolicited queue command responses in response to the command from the host;
    monitoring device operation for asynchronous events;
    detecting an asynchronous event; and
    providing notification of the asynchronous event by sending a response comprising the assigned tag to the host,
    wherein the unsolicited queue command responses are enabled persistently at least one of a reset operation and a loss of power.

14. The method of claim 13 wherein the tag is received with the command.

15. The method of claim 13 wherein the tag is assigned by the device.

16. The method of claim 13 wherein the tag comprises at least one of an invalid tag, out of range tag and a duplicate tag.

* * * * *